(12) United States Patent
Mollenhauer

(10) Patent No.: US 7,533,856 B2
(45) Date of Patent: May 19, 2009

(54) TRIPOD HEAD, IN PARTICULAR CAMERA TRIPOD HEAD

(75) Inventor: Berthold Mollenhauer, Munich (DE)

(73) Assignee: Camera Dynamics GmbH, Eching (DE)

(*) Notice: Subject to any disclaimer, the term of this patent is extended or adjusted under 35 U.S.C. 154(b) by 233 days.

(21) Appl. No.: 10/507,075

(22) PCT Filed: Mar. 6, 2003

(86) PCT No.: PCT/EP03/02319
§ 371 (c)(1),
(2), (4) Date: Jun. 2, 2005

(87) PCT Pub. No.: WO03/076844
PCT Pub. Date: Sep. 18, 2003

(65) Prior Publication Data
US 2005/0230576 A1 Oct. 20, 2005

(30) Foreign Application Priority Data
Mar. 13, 2002 (DE) .............. 102 11 046

(51) Int. Cl.
*F16M 11/02* (2006.01)
(52) U.S. Cl. .......... 248/177.1; 248/596; 248/597; 248/598; 248/371; 248/372.1; 248/398; 248/291.1; 248/292.11; 248/292.13; 248/123.11; 396/428
(58) Field of Classification Search ........ 248/596, 248/597, 598, 371, 372.1, 398, 291.1, 292.11, 248/292.13, 177.1, 123.11; 396/428
See application file for complete search history.

(56) References Cited

U.S. PATENT DOCUMENTS

| | | | |
|---|---|---|---|
| 4,083,524 A * | 4/1978 | O'Connor | 248/183.3 |
| 4,113,215 A | 9/1978 | Stapleton | |
| 4,226,303 A | 10/1980 | Thoma | |
| 4,447,033 A | 5/1984 | Jaumann et al. | |
| 4,919,376 A * | 4/1990 | Uehara et al. | 248/183.3 |
| 4,989,814 A * | 2/1991 | Uehara et al. | 248/183.3 |
| 5,553,821 A * | 9/1996 | Ishikawa | 248/292.11 |
| 6,328,487 B1 | 12/2001 | Cartoni | |
| 7,055,791 B2 * | 6/2006 | Lawrence | 248/578 |

FOREIGN PATENT DOCUMENTS

| | | |
|---|---|---|
| DE | 24 57 267 A1 | 6/1976 |
| DE | 27 01 520 A1 | 7/1977 |
| DE | 26 57 692 A1 | 6/1978 |
| DE | 30 26 379 A1 | 2/1982 |
| DE | 37 39 080 A1 | 5/1989 |
| DE | 39 08 682 A1 | 10/1990 |
| GB | 2 189 042 | 10/1987 |
| GB | 2 231 548 | 11/1990 |

* cited by examiner

*Primary Examiner*—J. Allen Shriver II
*Assistant Examiner*—Nkeisha J Dumas
(74) *Attorney, Agent, or Firm*—Wolf, Greenfield & Sacks, P.C.

(57) ABSTRACT

The invention relates to a tripod head, in particular a camera tripod head, whereby the return moment for balancing the tipping moment generated by the tipping moment exerted by the camera may be generated as near as possible to a sine sine curve with a compact construction. Essentially stationary return springs (17) are used for the above. The tilting movement of an arrangement (5) supporting the camera is transmitted over a carrier (26) by a cable (9), whereupon the pressure springs (17) are compressed and generate the necessary return moment.

24 Claims, 9 Drawing Sheets

TRIPOD HEAD, IN PARTICULAR CAMERA TRIPOD HEAD

TECHNICAL FIELD

The present invention relates to a tripod head, in particular a camera tripod head. As far as the invention is concerned, this means that not only a camera, but also other objects are intended to be placed on the tripod head as a mounting, such as aiming and measuring devices or the like.

Cameras which cannot be hand-held—for example because of their weight or size or because of special requirements in terms of steady camera movement—rest on a camera tripod or a camera pedestal. The camera is mounted on a camera tripod head so as to be rotatable around a horizontal axis (tilt axis) and a vertical axis (swivel axis) to enable the cameraman to follow moving objects with the camera's object lens. (In the following, solely the term "camera tripod" will be used; however, the descriptions apply equally to camera pedestals.) Whenever the camera is tilted, i.e. whenever the camera tripod head is rotated about its tilt axis, the distance between the camera's center of gravity and this tilt axis (height of center of gravity) together with the camera's weight generates a turning moment around the tilt axis, this turning moment being dependent on the tilt angle.

The weight compensation device is intended to permit force-free tilting of the camera by compensating for this tilt moment. Because of the rapid change in the load moment when different cameras or accessories such as teleprompters etc. are attached, it is necessary for the weight compensation to be rapidly and easily adjustable to different weights and different heights of the center of gravity.

In addition, the weight compensation is intended to hold the camera directly in any tilt position without any subsequent movement, to be precise within a tilt range of at least ±90°, to enable the entire spatial field of view to be covered during tilting of the camera.

In order to make gentle tilt movements possible, the camera tripod head should in addition have a damping device that is independent of the weight compensation, and as far as possible also adjustable and friction-free.

PRIOR ART

Known camera tripod heads have for example a hydraulic damping member with adjustable rotation resistance to damp the tilt movement, as described in German patent 24 57 267. Additionally, German patent P 26 57 692 describes a damping device for camera tripod heads.

As regards the weight compensation, it is for example known that the tilt moment should be compensated by means of several rubber disc torsion springs arranged one after the other on the tilt axis (DE 30 26 379). Here, the weight compensation can be adapted by engaging or disengaging individual springs.

A device for compensating the weight of an object swiveling about a pitch axis is known from DE 39 08 682 A1. A return moment acts, with the help of a spiral spring arrangement via a lever arm, on the pitch axis. In order to extend the pitch range and achieve the ideal turning moment compensation at all pitch angles, the compensating device exhibits a step-down gear, whereby the axis of the input shaft is the pitch axis and whereby the spiral spring arrangement acts, via a lever arm, on the output shaft. A tilt securing head in which the tilt movement for weight compensation is transferred via a set of gears to a disc spring assembly that is compressed by means of the tilt movement is known from DE-OS 27 01 520.

GB 2 189 042 A describes a camera tripod head in which a helical spring is compressed, via carriers, as a result of the tilt movement; for this purpose, the helical spring is mounted pivotably within the space.

A spring device for tripod weight compensation is known from DE 3 789 080 A1 and is used to compensate the turning moment that is produced by the weight of a payload in the case of tripods when they twist around a horizontal axis; what is proposed is a spring system in which a compensating turning moment that is largely proportional to the sine of the angle of rotation and hence ensures good balance is produced as a result of realizing special geometrical conditions for the use of for example tension and pressure springs. Use is made of a tripod head having a base member and a tiltable assembly that on the one hand is connected to the base member so as to be rotatable around a tilt axis, and to which on the other hand a camera mounting is securely attachable. A means for compensating the tilt moment has a carrier assembly that is attached at a position some distance from the tilt axis on the tiltable assembly and which acts on a spring when the mounting tilts, and as a result the spring exerts via the carrier assembly an approximately sinusoidal return moment on the tiltable assembly and thus on the mounting. The carrier assembly has a traction cable that is connected to the carrier and spring. The traction cable runs perpendicular to the tilt axis to a deflection roll and thereafter continues to run parallel to the tilt axis as far as a connection with the spring which is attached in a stationary manner. The location of the carrier is movable in order to adapt to different camera weights, which does, however, often have an effect on the looping of the deflection roll, with the result that a sinusoidal course of the return moment is achievable only approximately with regard to different camera weights.

DESCRIPTION OF THE INVENTION

The present invention is based on the task of creating a camera tripod head with a device for compensating for a weight moment that occurs during this tilt movement, said device compensating for the tilt moment as accurately as possible and yet capable of being compact in design.

The invention addresses this task by means of a tripod head, in particular a camera tripod head, comprising:

a base member and a tiltable assembly which, on the one hand, is connected to the base member so as to be rotatable around a tilt axis and to which, on the other hand, a mounting, particularly a camera mounting, is securely attachable; and a means for compensating a tilt moment that occurs during the tilt movement, said means having at least one energy-storing member that is supported on the base member. The tilt moment compensating means has a carrier assembly that is attached at a position some distance away from the tilt axis on the tiltable assembly and which acts on the energy-storing member when the mounting tilts and as a result the energy-storing member exerts, via the carrier assembly, an essentially sinusoidal return moment on the tiltable assembly and thus on the mounting. The carrier assembly has at least one carrier that is movable with the tiltable assembly around the tilt axis and has at least one pulling member that interacts with the carrier and the energy-storing member.

The pulling member, starting from the carrier, runs essentially perpendicular to the tilt axis to a deflection point, after which the pulling member runs essentially parallel to the tilt axis.

The energy-storing member is defined primarily as a member that stores potential energy.

While considerably increasing the compactness of the tripod head, the use of a pulling member that is exposed to the force by a carrier assembly as a result of the tilt movement as regards the action upon at least one energy-storing member achieves an essentially sinusoidal behavior of the return moment on the tiltable assembly and hence the tripod mounting and particularly the camera mounting. The special kinematics and initiation of force entail an effective influence on the desired sinusoidal behavior of the return moment, making it possible for the at least one energy-storing member to be held in an essentially stationary manner. Only the movement of the carrier or carriers is required, which movement is triggered by the tilt movement, said carrier or carriers being held more effectively within a restricted space in order to realize a compact tripod-head design. Even if, in accordance with the invention, the carriers are disposed in a stationary fashion in accordance with a kinematic reversal, and even if the energy-storing member moves with the tiltable assembly, this movement of the energy-storing member may be kept within limits so as to be able to realize a compact tripod-head design.

The energy-storing member may be a pressure spring or tension spring or torsion spring or spiral spring. A torsion spring would have an advantageous effect because this type of spring includes a high energy density. The pulling member can be deflected at least once during the course between the carrier and energy-storing member.

The pulling member is preferably deflected at least once over the course between the carrier and the one end of the pressure spring. The assignment from the carrier to the tilt axis, the pre-tension of the pressure spring, and the distance between the tilt axis and deflection point are chosen such that the counteracting compensating moment (return moment) satisfies the formula $$M = \left(1 + \frac{r_{s,max} - r_b + L_{vw,min}}{\sqrt{r_b^2 + r_s^2 - 2 \cdot r_b \cdot r_s \cdot \cos\alpha}}\right) \cdot c \cdot r_b \cdot r_s \cdot \sin\alpha$$

with the aim that the value of the fraction between brackets, i.e. $(r_{s,max} - r_b + L_{vw,min})$ is equal to zero or close to zero, or the value between brackets is 1 or as far as possible close to 1, in which formula $r_{s,max}$=maximum distance between tilt axis and carrier
$r_s$=distance between tilt axis and carrier
$r_b$=distance between the tilt axis and the pulling member's point of exit from the deflection point
$L_{vw,min}$=minimum spring pre-tension
$c$=spring rate of individual pressure spring
$\alpha$=respective tilt angle $r_{s,max}$, $r_b$ and $L_{vw,min}$ are defined quantities. The tilt angle $\alpha$ varies as a variable. Furthermore, $r_s$ is a variably definable quantity. The point of exit is defined as the location at which the pulling member leaves the deflection point in the direction away from the carrier.

In particular, the deflection favourably influences the initial behavior in the case of small tilt angles, though the deflection also especially achieves a favourable behavior of the return moment across the entire course of tilt between −90 and +90°. Spatial requirements and the behavior of the return moment can be readily influenced by adjusting the values $r_s$ and $r_b$ in combination with the other values.

To increase the energy density within a narrow space, a set of pressure springs that have smaller dimensions is provided as an alternative to one strong pressure spring, whereby a helical spring can be provided as a pressure spring.

The at least one pressure spring is expediently aligned essentially parallel to the tilt axis and can be compressed in this direction, whereby the at least one pressure spring can be clamped between a stationary support means and a movable support means, particularly one that is movable in the direction of the tilt axis.

The one end of the pulling member should preferably be connected to the movable support means. The other end of the pulling member is connected to the carrier. It may be advantageous for the deflection point situated between the ends of the pulling member to be formed by a deflector roll which is rotatable around its own roll shaft. Frictional forces can be reduced as a result and the force behavior can be influenced in the sense of adjusting the return moment. This also applies when the deflector roll is pivotably mounted essentially at that location where the pulling member, coming from the carrier after deflection, leaves the deflector roll in the direction of the movable support means.

The force behavior is particularly favourably affected when the pulling member, starting from the carrier, passes at an acute angle or essentially perpendicular to the tilt axis to the deflection point and, after deflection, essentially parallel to the tilt axis with respect to the movable support means.

A pulling-member course that is favourable for the desired sinusoidal course of the return moment is obtained when one end of the pulling member is connected to the movable support means, passes from there, via the deflection point, to the carrier, where the pulling member is connected to the carrier, and returns from there, via the deflection point, back to the movable support means. As a result, the act of attaching the ends of the pulling member is simplified, which does not have to take place at the carrier. Particularly if use is made of an aramid cable, the ends of which are difficult to attach, the pulling member can also be used as a continuous pulling member, at the ends of which a looping takes place respectively at the carrier and the movable support means. In the sense of a balanced system, the aforementioned course can be provided such that at least two pulling members are disposed symmetrically relative to the tilt axis.

A further influence on the force behavior and the resultant influences on the sinusoidal behavior of the return moment is possible if at least one carrier is disposed so as to be rotatable around a shaft parallel to the tilt axis, i.e. the carrier prevents the pulling member from twisting and ensures appropriate compensation.

To adjust the spring pre-tension and the lever conditions, the distance between the tilt axis and carrier can be variable as a result of the fact that the at least one carrier, perpendicular to the tilt axis, is preferably continuously movable in terms of location and can be fixed in the respective position. This adjustment, via the pulling member, brings about a change in the pressure spring's pre-tension.

If the ends of the pulling member are to be attached easily, the pulling member can pass through the carrier so that the two ends of the revolving pulling member are attached to the movable support means, which is easier to bring about. This is particularly true when a laid or braided steel or aramid-fiber cable is used. Such aramid-fiber cables are known on a larger scale from the lift construction sector and are known, on a scale that corresponds to the invention, as tennis racket strings. These aramid-fiber cables are preferably impregnated with an abrasion-resistant resin. As a result, it is possible to stop such cables from offering greater resistance, especially in the event of alternating stress and of deflections, because the early abrasion of the fibers within the cable can be reduced considerably. These cables permit much smaller deflection radii, which is of particular significance in the present invention.

The pulling member may, however, also be clamped within the carrier, with the result that when the carrier moves around the tilt axis, there is action on the pulling member in such a way that the pulling member causes the movable support means to move and thus brings about compression of the pressure spring.

If the pulling member or the cable is to be guided more effectively, at least one groove can be provided at the deflection point, and here particularly within the deflector roll, in order to partly receive the pulling member.

The carrier may be a projecting pin aligned parallel to the tilt axis and disposed at a distance from the tilt axis. When it was mentioned beforehand that the pressure spring is supported at the base member and is thus disposed in an essentially stationary fashion, the invention nevertheless encompasses solutions according to which, in the manner of kinematic reversal, the carriers are securely attached to the base and the pulling member, together with the pressure spring, is attached to the tiltable assembly.

If a second deflection of the pulling member is installed, the scope of this invention's protection permits the use of a tension spring instead of the pressure spring.

Several pulling members, preferably two pulling members, can be provided in a symmetrical arrangement relative to the tilt axis. This symmetrical arrangement can, however, be realized in that a traction cable which is provided on both sides of the tilt axis is formed continuously within the region of the carriers. To enable this to function in an unimpeded manner that ensures perfect movement, each carrier is formed by a deflection combination that each comprises two deflection points. These deflection points can each be formed by a deflector roll, whereby at the two deflection points, one the deflection point is formed by a fixed roll and the other by a pivotable roll. The fixed rolls of each carrier are assigned to one another at a fixed distance because the course between these two rolls does not vary during the tilt movement. This is not the case in the region of the pivotable roll. Pivotability causes this roll to follow the pulling member's course that varies with the tilt.

BRIEF DESCRIPTION OF THE DRAWINGS

Embodiment examples of the invention will now be described in more detail with reference to the enclosed drawings.

In particular.

DETAILED DESCRIPTION OF PREFERRED EMBODIMENTS OF THE INVENTION

Figure 1:
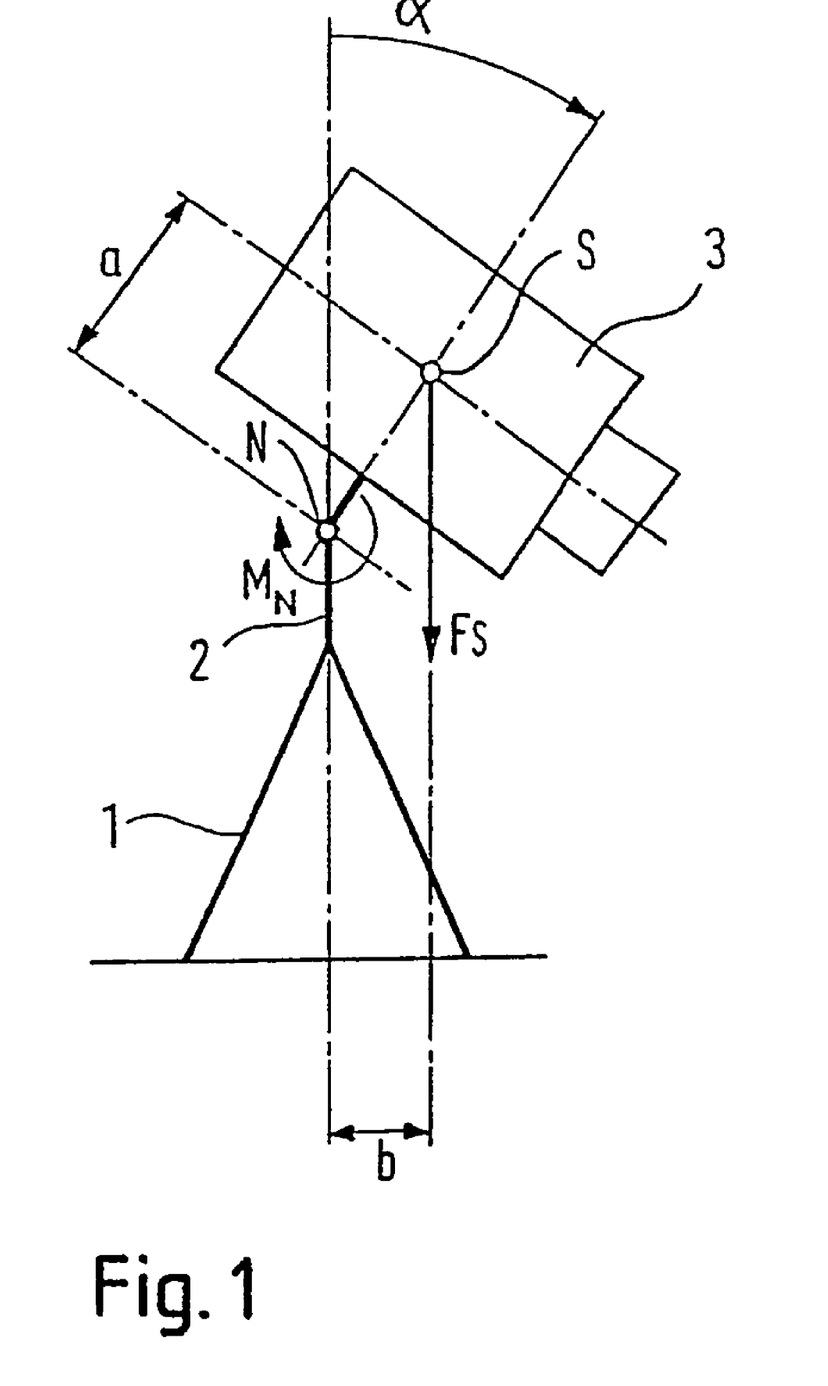
FIG. 1 shows a schematic view of a camera tripod.

FIG. 1 schematically illustrates a camera tripod 1 having a camera tripod head 2 and a camera 3 mounted thereon. The camera is deflected around the tilt angle $\alpha$ with respect to the camera's position of equilibrium, in which its center of gravity S is situated exactly vertically above the tilt axis N running transversely to the plane of projection. The center-to-center spacing a of the camera's center of gravity from the tilt axis N results in a lever arm $b = a \sin \alpha$, which together with the camera's weight $F_s$ brings about a tilt moment $M_N$ around the tilt axis N. As the angle $\alpha$ increases, the tilt moment $M_N = F_s$ a sin $\alpha$ rises sinusoidally.

Figure 2A:
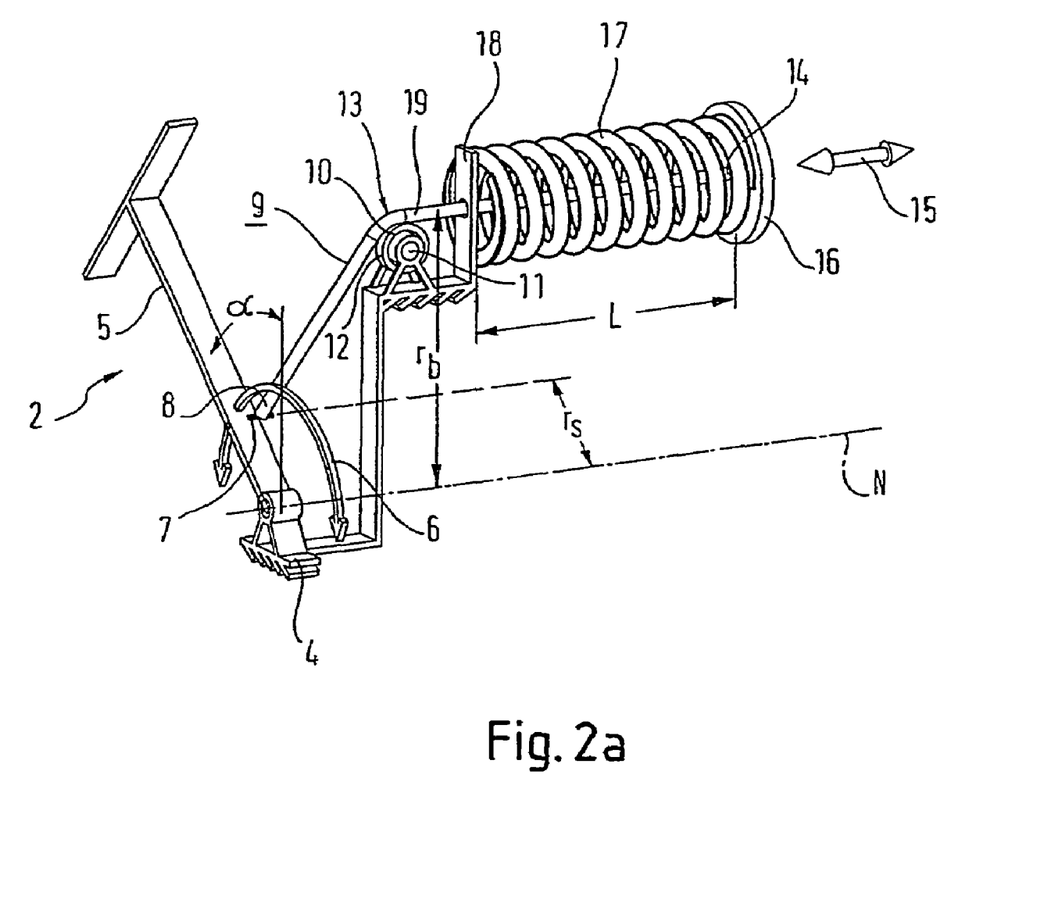
FIG. 2a shows a schematic representation of the present invention's weight-compensating principle in perspective view, use being made of a pressure spring.

A base member 4, depicted schematically, is identifiable from FIG. 2a. On this base member is mounted a tiltable assembly 5 so as to be tiltable, pitchable or inclinable around the tilt axis N. A camera, which is not depicted here, is usually mounted on this tiltable assembly and likewise then undergoes the tilt movement. The tilt movement is indicated by double arrow 6. A schematically depicted carrier 7, to which one end 8 of a cable 9 is attached, is located on the tiltable assembly. Here, the cable 9 runs at an acute angle relative to the tilt axis N (preferably running perpendicular to the tilt axis) to a deflector roll 10 that is rotatable about its shaft 11. This deflector roll 10 defines a deflection point 13 and has a groove 12 within which the cable 9 is guided. The other end 14 of the cable 9 is attached to a movable support member 16 for a helical spring 17, said support member 16 being movable in a manner corresponding to double arrow 15. On the opposite side, the helical spring 17, acting as a pressure spring, is supported on a fixed support member 18 of the base member 4, whereby the cable 9 runs through this fixed support member 18. The cable 9 runs essentially parallel to the tilt axis N within the point of exit 19 of the cable 9 at the deflector roll 10 and thus at the deflection point 13.

The pre-tensioned helical spring 17 has a length L between the support members 16 and 18. When there is a tilt angle $\alpha$ of 0°, this length L corresponds to the length of the pre-tensioned spring. The distance $r_s$ between the carrier 7 and the tilt axis N has a defined set value that may be variable, however, in the readied tripod head. There is still a distance $r_b$, which has to be set to a certain value, between the cable axis of that cable portion which runs parallel to the tilt axis N and the tilt axis N. This distance $r_b$ as well as the distance $r_{s,max}$ and the minimum spring pre-tension must primarily be set for a specific tripod head such that, on the one hand, an optimum sinusoidal course of the return moment is achievable and, on the other hand, optimum spatial conditions are obtained for the tripod head.

When the tiltable assembly 5 is tilted out of the zero position, for example through the angle α, the distance between the carrier 7 and the deflection point 13 is lengthened, with the result that when the length of the cable 9 remains constant, the cable, corresponding to the lengthening of distance, moves the movable support member 16 to the left (arrow 15) when FIG. 2a is examined, thus compressing the helical spring 17 and reducing the length L. This produces a return moment that is dependent on the angle α and acts as weight compensation for the tilt moment exerted by the camera, as has already been described in conjunction with FIG. 1.

Figure 2B:
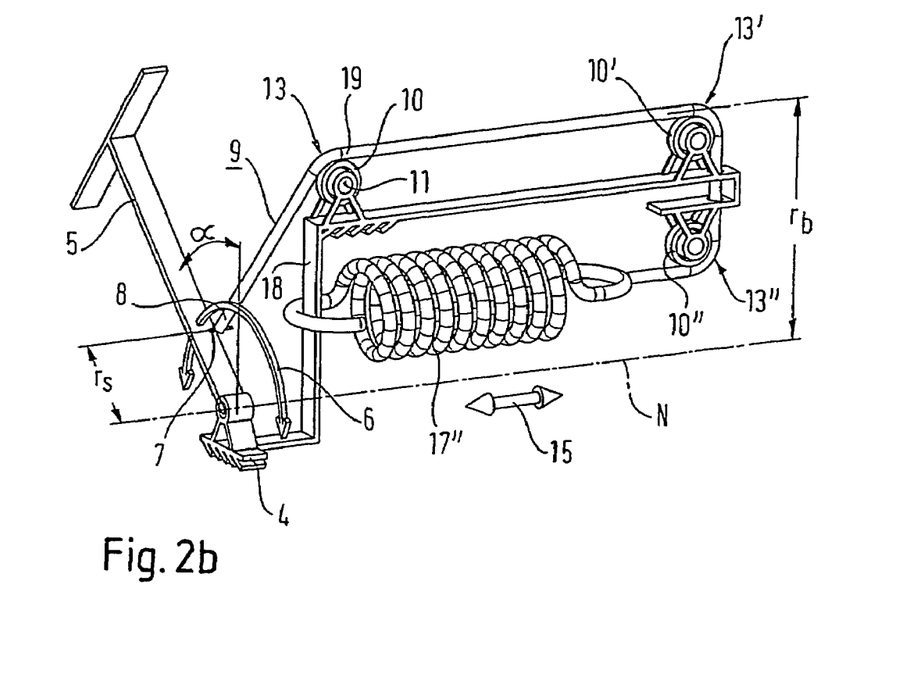
FIG. 2b shows a schematic representation of the present invention's weight-compensating principle in perspective view, use being made of a tension spring.

FIG. 2b, using similar reference symbols, depicts the principle underlying the invention in a manner similar to that shown in FIG. 2a. But a tension spring 17" is provided here instead of a pressure spring. Otherwise, the conditions are essentially the same and the same parts are designated by the same reference symbols. A second and third deflection 13' and 13" around deflector rolls 10' and 10" takes place here, in other words a deflection through 180 degrees occurs overall. This makes it possible to let the helical spring take effect as a tension spring 17".

Figure 2C:
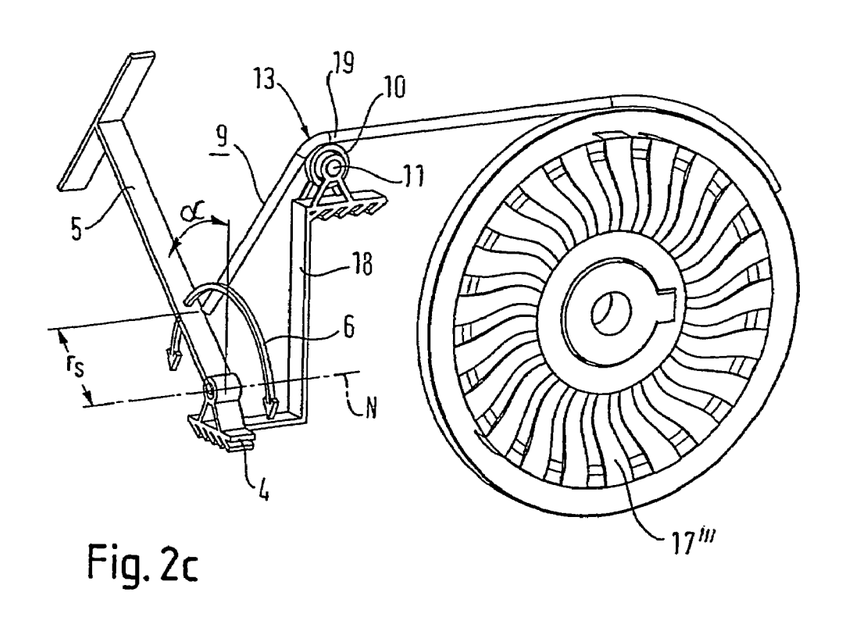
FIG. 2c shows a schematic representation of the present invention's weight-compensating principle in perspective view, use being made of a torsion spring.

FIG. 2c depicts similar conditions. Here, however, use is made of a torsion spring 17'''. Here, too, parts that are identical to those in FIG. 2a are designated by the same reference symbols.

Figure 2D:
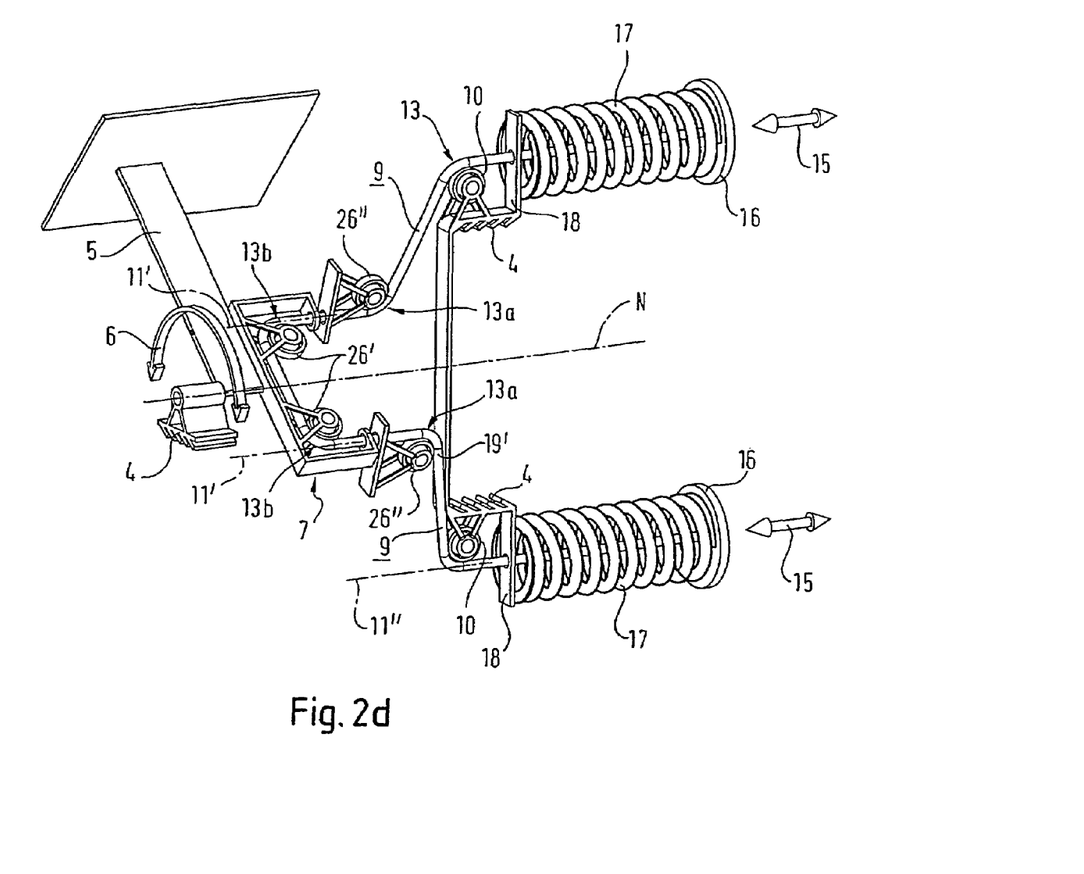
FIG. 2d shows a schematic representation of the present invention's weight-compensating principle in perspective view, use being made of a single traction cable which passes through the carrier assembly.

FIG. 2d makes it apparent how a continuous traction cable 9 can be used in a symmetrical configuration relative to the tilt axis N. Those features that concur with the preceding drawings are designated by the same reference symbols and are not described again here in conjunction with FIG. 2d. Reference number 4 designates those parts which are connected to the base member and which are disposed in a stationary fashion with respect to the tiltable assembly 5. The carrier assembly 7 is disposed here such as to be movable with the tiltable assembly 5. The traction cable 9 passes through this carrier assembly 7. The carrier assembly 7 comprises a deflector roll combination that comprises, on both sides of the tilt axis N, two deflection points 13a and 13b. The deflection point 13b is formed by one deflector roll 26' respectively. These deflector rolls 26', preferably together with the deflector rolls 26", are adjustable in terms of their distance relative to the tilt axis N and are attached to the tiltable assembly 5 in each particular position in a fixable, albeit non-pivotable manner, because the cable course between these two rolls does not alter with respect to the course's direction if the tiltable assembly 5 is moved out of the zero position into a tilt setting. The rolls 26", however, are pivotably mounted around a shaft 11' which passes here through the course of the cable between the rolls 26' and 26". This pivotable roll 26" can therefore be adjusted to the cable course that alters during the tilt movement. Additionally, the shaft 11' may pass through a point of exit 19' of the cable 9 at the roll 26". In this respect, the deflector roll 10 can likewise be pivotably mounted, to be precise within the base member 4. The corresponding pivoting shaft is designated as 11".

Figure 3:
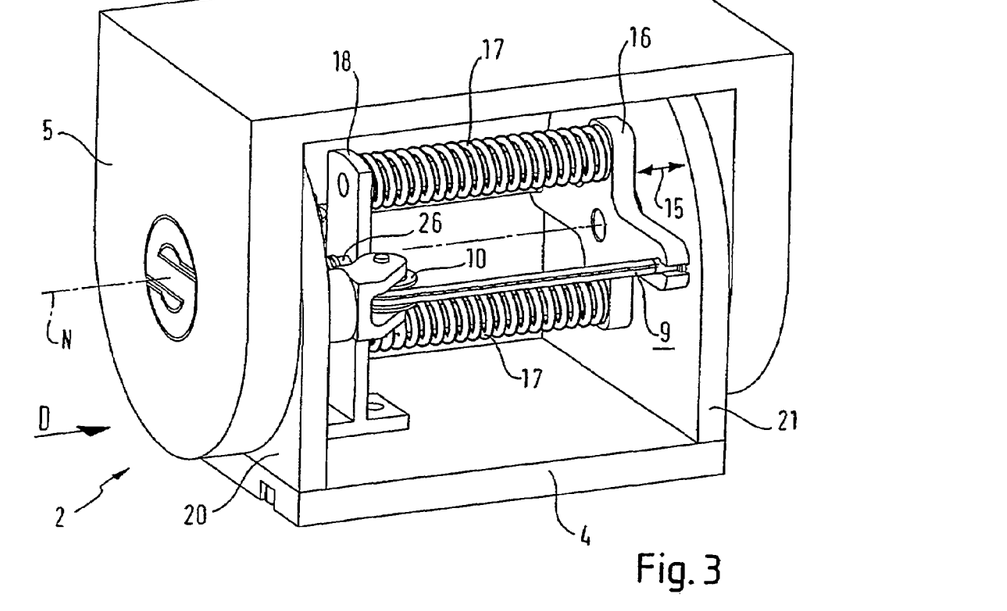
FIG. 3 shows a perspective view of a schematic embodiment example of camera tripod head, in which the tiltable assembly is depicted.

FIG. 3 is a schematic view that shows a camera tripod head 2 to such an extent as is necessary for the present invention. The tiltable assembly 5 is tiltably mounted within the base member 4, its being particularly tiltable in an angle range of +/−90° out of a zero position, as shown in FIG. 3. With respect to the base member 4, the tiltable assembly 5 executes this tilt movement around the tilt axis N. A support member 16 for pressure springs 17 that is movable in the direction of the tilt axis N corresponding to double arrow 15 is mounted within the base member 4 on the tilt axis N at 16' in FIG. 6. The pressure springs 17 are designed here as helical springs. A fixed support member 18 connected to the base member 4 is located at a distance from the movable support member 16. The pressure springs 17 are located between these support members 16, 18 such that they serve to support the pressure springs 17. In the zero position of the tiltable assembly 5, the length L of the pre-tensioned pressure springs 17 is determined by the distance between the support members 16, 18.

As is apparent from FIG. 3 in particular, the tiltable assembly 5 is mounted in shanks 20 and 21 of the base member 4 at the height of the tilt axis N. In the embodiment example, these shanks 20 and 21 are aligned perpendicular to a base plate.

The tiltable assembly 5, with a central rotational member 22, protrudes through the shank 20 where it is mounted within a roller bearing 23 (FIG. 6) as regards the rotational movement that is initiated by the tilt movement. In this embodiment, two carriages 24 and 25 are provided within the rotational member 22; mainly in the zero position shown in FIG. 4, these carriages are movable perpendicular to the tilt axis N and can be locked in the respective position, to be precise in a symmetrical position relative to the tilt axis N. Each of these carriages 24 and 25 is provided with a carrier pin 26, each of which projects out of the respective carriage 24 and 25 parallel to the tilt axis N, as shown in FIG. 4.

On each side, a deflector roll 10 with guide grooves 12 is provided between the respective carrier pin 26 and the movable support member 16. This deflector roll 10 is rotatable around a shaft 11 that is disposed perpendicular to the tilt axis within the zero position of the tiltable assembly 5. It should be mentioned here that each symmetrical arrangement of the parts described above is conceivable over an angle range of 360° if the corresponding zero position is defined. In this case, the appropriate return moment is obtained on the basis of this zero position.

Figure 4:
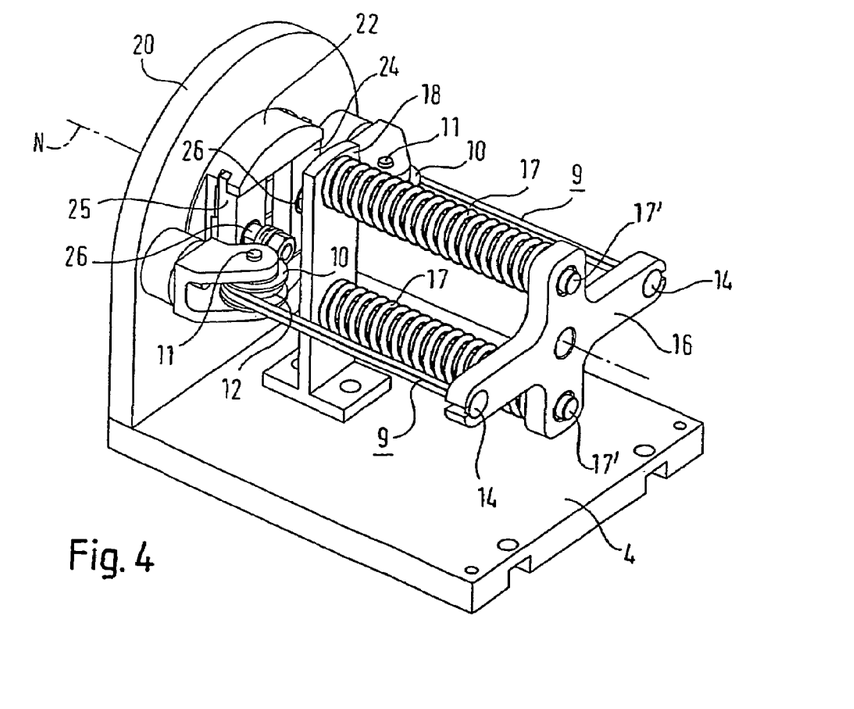
FIG. 4 shows a different perspective view of the camera tripod head according to FIG. 3, though without depicting the tiltable assembly.

In the embodiment example according to FIGS. 3 and 4, two pressure springs 17 are provided as helical springs. Of course, to increase the energy density, it is possible to provide either a single spring of greater strength or a set of several springs. In the embodiment example shown here, a cable 9, which acts as a pulling member and is attached at its one end 14 inside the movable support member 16, first passes around the deflector roll 10 to the carrier pin 26, and returns from there, via the deflector roll 10, to the movable support member 16 along the same route. This applies to both sides. The cable 9 may be wedged within the carrier pin 26. In this instance, the carrier pin 26 is rotatable around its shaft that is parallel to the tilt axis. If the cable 9 freely loops around the carrier pin 26 inside a groove, the ability of the carrier pin 26 to rotate in this manner can be dispensed with if there is correspondingly low friction. It must be mentioned in this respect that the cable 9 can likewise be used as a continuous cable. The cable 9 would then be fixed by a simple loop at the movable support member 16 in the region of the end point 14. The end of the cable therefore does not have to be wedged in a manner that is per se complicated, which is especially the case with synthetic-fiber cables, such as aramid cables. Instead of guiding the cable 9 twice, each side can, additionally, be provided with a single cable 9 that is attached at its one end 14 within the movable support member 16 and from there it is guided, in parallel and in the direction of the tilt axis N, to the deflector roll 10, just as in the embodiment in FIG. 4, and from there it is guided to the carrier pin 26 where the other end 15 of the cable 9 is secured. In this case, the carrier pins 26 are mounted inside the carriages 24 and 25 so as to be rotatable about their shaft, which is parallel to the tilt axis N. As is evident from FIG. 6, the cable 9 passes between the deflector roll 10 and the carrier pin 26 perpendicular to the tilt axis N, with these corresponding cable portions being aligned together in the zero position.

As regards both sides, the traction cable can also be a single simple and continuous guided cable, such that the cable passes through both carriers 26.

Figure 6:
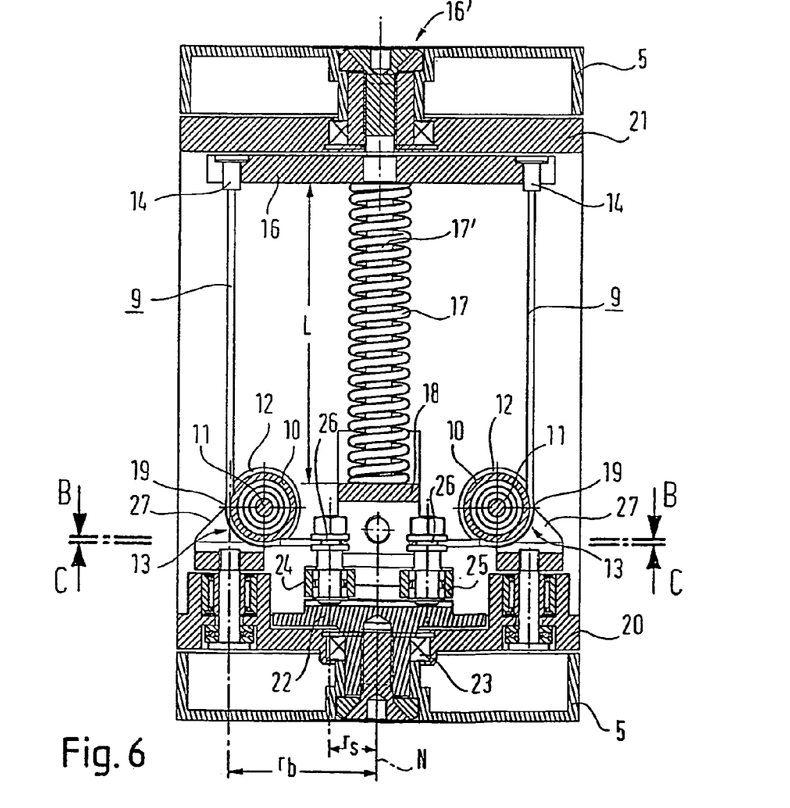
FIG. 6 shows a sectional view of the camera tripod head along the line A-A in FIG. 5.

In the zero position, the helical springs 17 have a length L that corresponds to the pre-tensioned spring. This spring pre-tension can be altered by varying the distance $r_s$ between the carrier pins 26 and the tilt axis (FIG. 6). In the device according to FIG. 6, a distance $r_b$ is also defined between the course of that portion of the cable 9 between the deflector roll 10 and the movable support member 16 as a course that is parallel to the tilt axis N and the tilt axis N. A guide shaft 17' is located inside the helical springs 17 so as to stop the helical spring 17 that is used as a pressure spring from buckling whenever tilting occurs and this pressure spring or these pressure springs generate(s) a return moment; The cables 9 act as pulling members that should be as inextendible as possible with regard to the forces that arise. For this purpose, use can be made of prestretched cables, particularly laid steel or aramid cables.

Figure 5:
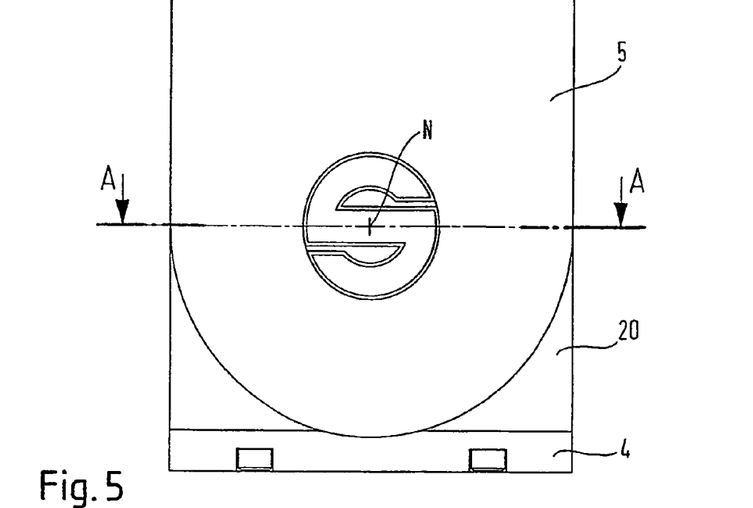
FIG. 5 shows a schematic front view of the camera tripod head.

As view D according to FIG. 3, FIG. 5 serves to show the sectional line A-A for the sectional view of FIG. 6.

Figure 7:
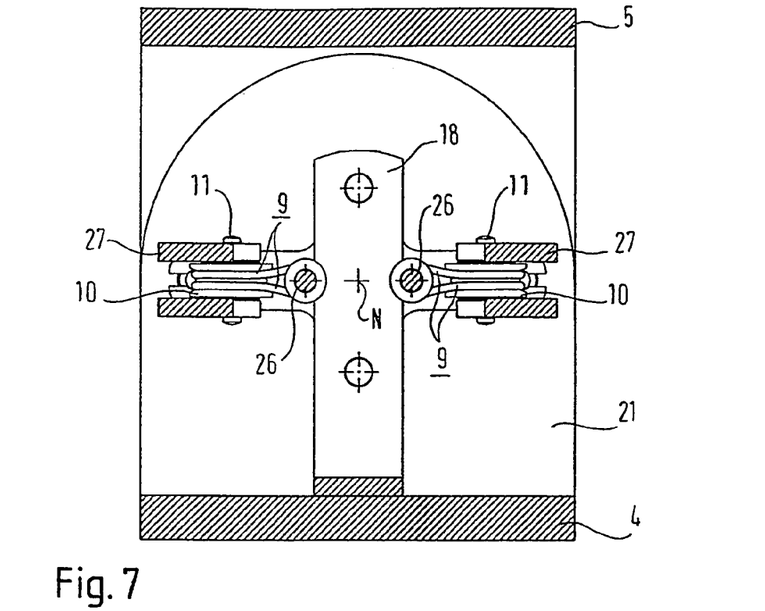
FIG. 7 shows a sectional view through the camera tripod head according to FIGS. 5 and 6 along the sectional line C-C.
Figure 8:
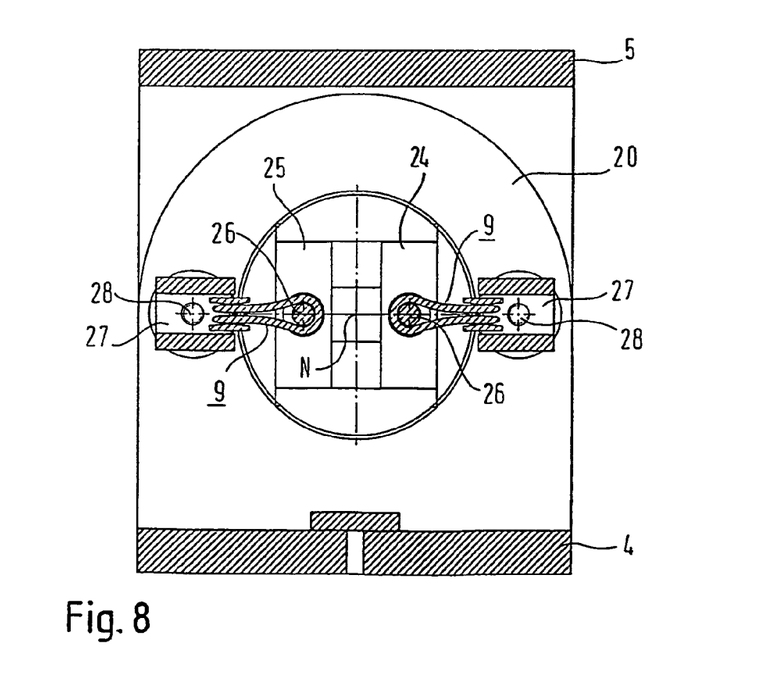
FIG. 8 shows a sectional view similar to FIG. 7, though along the sectional line B-B in FIG. 6.

In accordance with the depiction in FIGS. 6, 7 and 8, the deflector rolls 10 are each mounted within a bearing bracket 27. This bearing bracket is preferably freely rotatable around a shaft 28. The shaft 28 runs parallel to the tilt axis N and preferably through the point of exit 19 and is located in the extension of the portion of the cable 9 between the end point 14 and the deflector roll 10, as is particularly evident from FIG. 6.

FIGS. 7 and 8 show clearly how when the cable is guided twice, the cable 9 loops around each carrier pin 26 with the result that both free ends 14 are attached simply to the movable support member 16.

Figure 9:
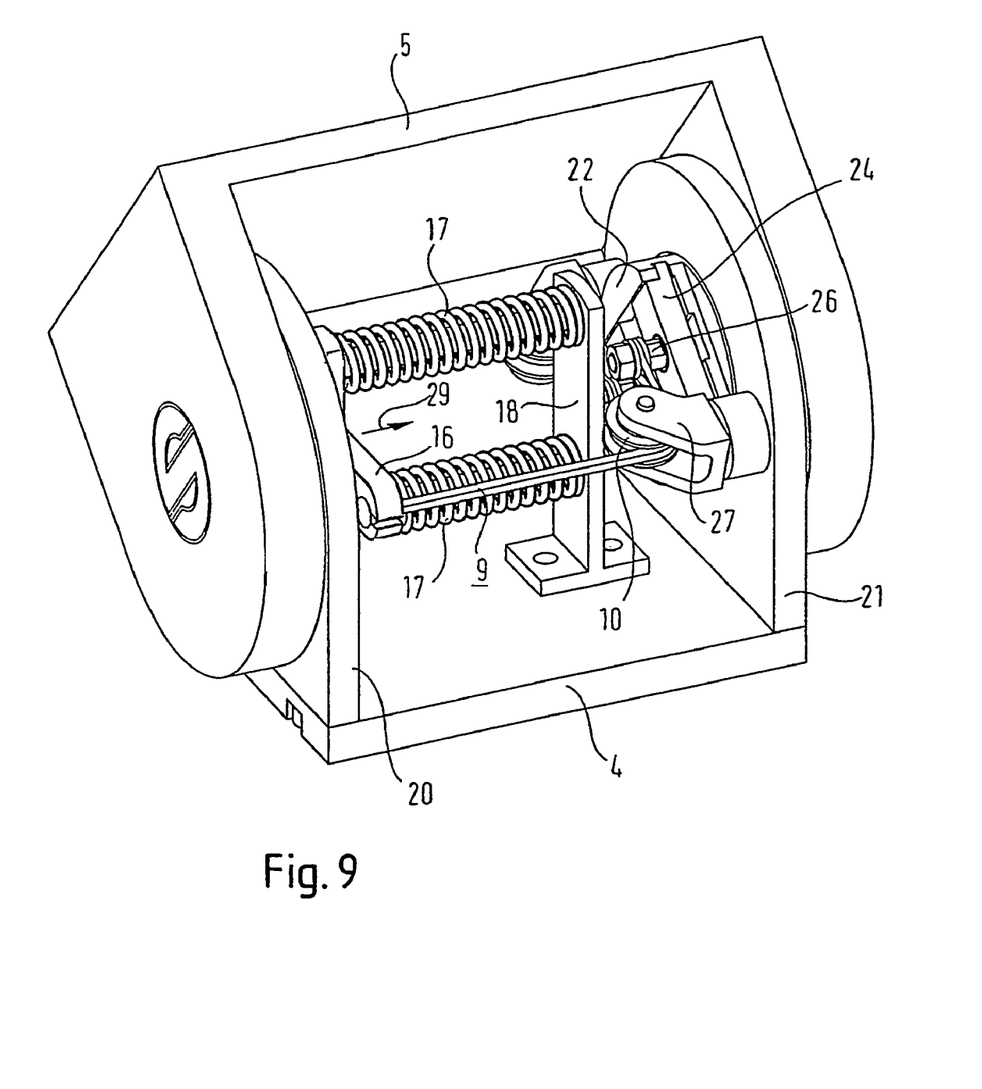
FIG. 9 shows a perspective view of the camera tripod head similar to FIG. 3, though in a slightly different view and in a tilt position of the tiltable assembly through 50° out of the zero position.
Figure 10:
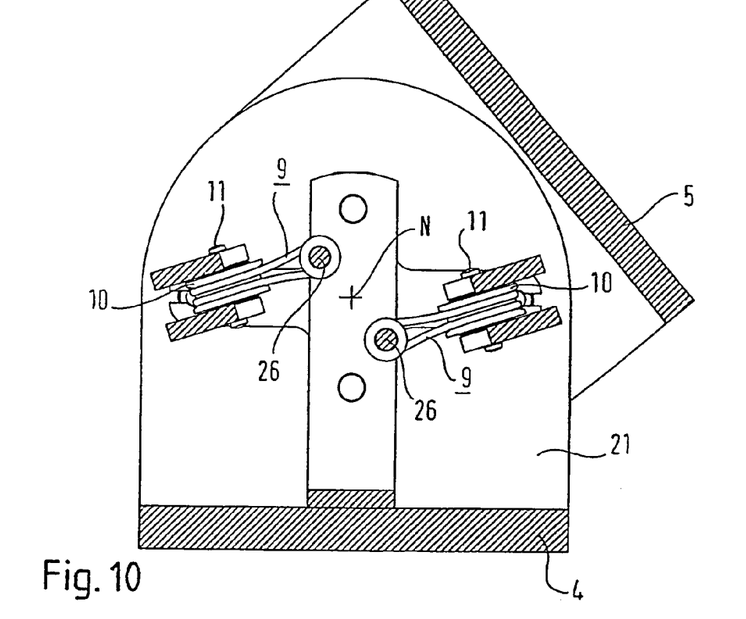
FIG. 10 shows a sectional view of the view similar to FIG. 7, though with the tilt position of FIG. 9.
Figure 11:
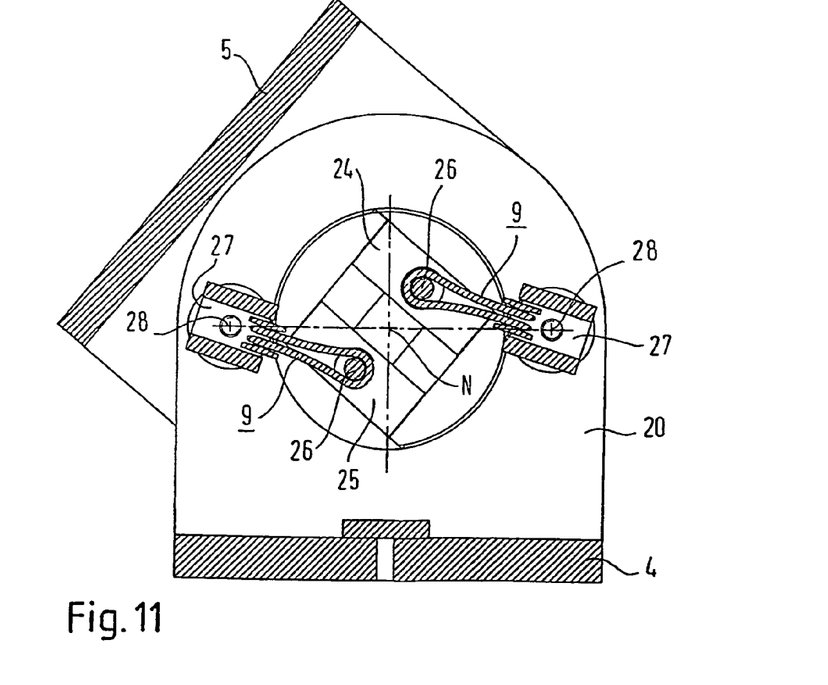
FIG. 11 shows a sectional representation similar to FIG. 8 likewise corresponding to the tilt position of FIG. 9.

There now follows a short description of the functional principle based on FIGS. 9, 10 and 11. If the tiltable assembly 5 is moved out of the zero position shown in FIG. 3 and moved into the inclined position of approx. 50 degrees shown in FIG. 9, the carriers 26 move out of the position shown in FIG. 7 or FIG. 8 and move into the position shown in FIG. 10 or FIG. 11, which position will depend on the direction of viewing. The distance between the carrier pin 26 and the deflection point 13 will increase. This is clearly identifiable when FIG. 7 is compared with FIG. 10 or FIG. 8 with FIG. 11. While the total length of the cable 9 stays the same, the above process causes the movable support member 16 to move in the direction of the arrow 29 in FIG. 9, which shortens the length L of the helical spring 17 indicated in FIG. 6. As a result, the helical spring 17 is compressed more. The same thing happens when the carriages 24 and 25 in FIG. 6 are moved symmetrically closer to the tilt axis N and are fixed, thereby enabling the spring pre-tension present in the zero position to increase. If the process is reversed, the spring pre-tension can also be reduced.

The aforementioned, special free rotational mounting of the deflector roll 10 around the shaft 28 that is parallel to the tilt axis N makes it possible to align the deflector roll 10 with the cable course in the various tilt positions, as is clearly identifiable in FIGS. 10 and 11. Optimum rotational mounting is obtained when the shaft 28 passes through the point of exit 19 and in the extension of the cable portion between the end 14 and this point of exit 19.

In this embodiment, the return moment is determined as follows:

| Variable | Value | Unit | Description |
|---|---|---|---|
| $r_{s,max}$ | 15 | mm | Maximum distance between tilt axis and carrier |
| $r_s$ | 5 | mm | Distance between the tilt axis and carrier |
| $r_b$ | 38 | mm | Distance between the tilt axis and the pulling member's point of exit |
| $L_{vw,min}$ | 23 | mm | Minimum spring pre-tension at $\alpha = 0°$ and $r_s = r_{s,max}$ |
| c | 20 | N/mm | Spring rate of pressure spring |
| M | — | Nmm | Return moment |
| $\alpha$ | — | ° | Respective tilt angle |

The return moment is arrived at from:

$$M = \left(1 + \frac{r_{s,max} - r_b + L_{vw,min}}{\sqrt{r_b^2 + r_s^2 - 2 \cdot r_b \cdot r_s \cdot \cos\alpha}}\right) \cdot c \cdot r_b \cdot r_s \cdot \sin\alpha$$

Ideal:

$$r_{s,max} - r_b + L_{vw,min} = 0$$

The invention claimed is:

1. A tripod head, in particular a camera tripod head, comprising:
   a base member,
   a tiltable assembly, which, on the one hand, is connected to said base member so as to be rotatable about a tilt axis and to which, on the other hand, a mounting, particularly a camera mounting, is securely attachable,
   a means for compensating a tilt moment that occurs during the tilt movement, said means having at least one energy-storing member that is freely supported on said base member,
   wherein
   said means for compensating the tilt moment has at least one carrier connected to said tiltable assembly at a position some distance away from said tilt axis so that it is movable with said tiltable assembly around said tilt axis and has at least one pulling member that interacts with said carrier and said energy-storing member so that the carrier acts on said energy-storing member when said mounting tilts, and as a result, said energy-storing member exerts, via said carrier, an essentially sinusoidal return moment on said tiltable assembly and, thus, on said mounting,
   said pulling member, starting from said carrier, running essentially perpendicular to said tilt axis toward a deflection point, and after the deflection, said pulling member running essentially parallel to said tilt axis to a movable support means, wherein said one end of said pulling member is connected to said movable support means, passes from there, via said deflection point, to said carrier, where said pulling member is connected to said carrier, and from there returns, via said deflection point, back to said movable support means and wherein said pulling member is designed as a continuous cable.

2. A tripod bead according to claim 1, wherein said energy-storing member is a pressure spring or a tension spring or a torsion spring or a spiral spring.

3. A tripod head according to claim 1, wherein said pulling member is deflected or turned back at least once along a pat between said carrier and energy-storing member.

4. A tripod head according to claim 1, wherein said pulling member is deflected once along a path between said carrier and one end of at least one pressure spring, and a distance from said carrier to said tilt axis, a pre-tension of said pressure spring, and a distance $r_b$ between said tilt axis and the deflection point are chosen such that a counteracting compensating or return moment satisfies the formula $$M = \left(1 + \frac{r_{s,max} - r_b + L_{vw,min}}{\sqrt{r_b^2 + r_s^2 - 2 \cdot r_b \cdot r_s \cdot \cos \alpha}}\right) \cdot c \cdot r_b \cdot r_s \cdot \sin \alpha$$

with an aim that a value of a fraction between brackets, i.e. $(r_{s,max} - r_b + L_{vw,min})$ is equal to zero or close to zero, or a value between brackets is 1 or as far as possible close to 1, in which formula
$r_{s,max}$=maximum distance between tilt axis and carrier
$r_s$=distance between tilt axis and carrier
$r_b$=distance between the tilt axis and the pulling member's point of exit from the deflection point
$L_{vw,min}$=minimum spring pre-tension
c=spring rate of individual pressure spring
α=respective tilt angle.

5. A tripod head according to claim 1, wherein a set of pressure springs is provided.

6. A tripod head according to claim 2, wherein said at least one pressure spring is a helical spring.

7. A tripod head according to claim 2, wherein said at least one pressure spring is aligned essentially parallel to said tilt axis and can be compressed in this direction.

8. A tripod head according to claim 2, wherein said at least one pressure spring is clamped between a stationary support means and a movable support means, which is movable particularly in the direction of said tilt axis.

9. A tripod head according to claim 1, wherein one end of said pulling member is connected to a movable support means and another end is connected to said carrier.

10. A tripod head according to claim 1, wherein said deflection point of said pulling member is formed by a deflector roll which is rotatable around its own roll shaft.

11. A tripod head according to claim 10, wherein said deflector roll is mounted so as to be pivotable essentially around an axis that passes through a site where said pulling member, coming from said carrier after deflection, leaves said deflector roll in the direction of said movable support means.

12. A tripod head, in particular a camera tripod head, comprising:
a base member,
a tillable assembly, which, on the one hand, is connected to said base member so as to be rotatable about a tilt axis and to which, on the other hand, a mounting, particularly a camera mounting, is securely attachable,
a means for compensating a tilt moment that occurs during the tilt movement, said means having at least one energy-storing member that is freely supported on said base member,
wherein
said means for compensating the tilt moment has at least one carder connected to said tiltable assembly at a position some distance away from said tilt axis so that it is movable with said tiltable assembly around said tilt axis and has at least one pulling member that interacts with said carrier and said energy-storing member so that the carrier acts on said energy-storing member when said mounting tilts, and as a result, said energy-storing member exerts, via said carrier, an essentially sinusoidal return moment on said tiltable assembly and, thus, on said mounting,
said pulling member, starting from said carrier, running essentially perpendicular to said tilt axis toward a deflection point, and after the deflection, said pulling member running essentially parallel to said tilt axis, wherein at least two pulling members are disposed symmetrically relative to said tilt axis.

13. A tripod head, in particular a camera tripod head, comprising:
a base member,
a tiltable assembly, which, on the one hand, is connected to said base member so as to be rotatable about a tilt axis and to which, on the other hand, a mounting, particularly a camera mounting, is securely attachable,
a means for compensating a tilt moment that occurs during the tilt movement, said means having at least one energy-storing member that is freely supported on said base member,
wherein
said means for compensating the tilt moment has at least one carrier connected to said tiltable assembly at a position some distance away from said tilt axis so that it is movable with said tiltable assembly around said tilt axis and has at least one pulling member that interacts with said carrier and said energy-storing member so that the carrier acts on said energy-storing member when said mounting tilts, and as a result, said energy-storing member exerts, via said carrier, an essentially sinusoidal return moment on said tiltable assembly and, thus, on said mounting,
said pulling member, starting from said carrier, running essentially perpendicular to said tilt axis toward a deflection point, and after the deflection, said pulling member running essentially parallel to said tilt axis, wherein there is a symmetrical arrangement on both sides of said tilt axis, a continuous pulling member is provided, said pulling member being of a continuous design as a cable in a region of said carriers.

14. A tripod head according to claim 13, wherein a carrier assembly formed from a deflection combination that each comprises two deflection points.

15. A tripod head according to claim 14, wherein said deflection points are formed by a deflector roll, whereby at said two deflection points, one deflection point is formed by a fixed deflector roll and the other deflection point is formed by a pivotable deflector roll.

16. A tripod head according to claim 1, wherein said at least one carrier is rotatable around a shaft that is parallel to said tilt axis.

17. A tripod head according to claim 1, wherein said at least one carrier is perpendicular to said tilt axis, preferably continuous, movable in terms of location and fixable in the respective position.

18. A tripod head according to claim 1, wherein said pulling member passes through or loops around said carrier.

19. A tripod head according to claim 1, wherein said pulling member is clamped within said carrier.

20. A tripod head according to claim 1, wherein said pulling member is inextendible.

21. A tripod head according to claim 20, wherein said pulling member is prestretched.

22. tripod head according to claim 20, wherein said cable is a wire or a laid or braided steel or aramid-fiber cable.

23. A tripod head, in particular a camera tripod head, comprising:
   a base member,
   a tiltable assembly, which, on the one hand, is connected to said base member so as to be rotatable about a tilt axis and to which, on the other hand, a mounting, particularly a camera mounting, is securely attachable,
   a means for compensating a tilt moment that occurs during the tilt movement, said means having at least one energy-storing member that is freely supported on said base member,
   wherein
   said means for compensating the tilt moment has at least one carrier connected to said tiltable assembly at a position some distance away from said tilt axis so that it is movable with said tiltable assembly around said tilt axis and has at least one pulling member that interacts with said carrier and said energy-storing member so that the carrier acts on said energy-storing member when said mounting tilts, and as a result, said energy-storing member exerts, via said carrier, an essentially sinusoidal return moment on said tiltable assembly and, thus, on said mounting,
   said pulling member, starting from said carrier, running essentially perpendicular to said tilt axis toward a deflection point, and after the deflection, said pulling member running essentially parallel to said tilt axis, wherein at least one groove is provided within a deflector roll for partly receiving and guiding said pulling member.

24. A tripod head according to claim 1, wherein said carrier is a carrier pin aligned parallel to said tilt axis.

* * * * *

UNITED STATES PATENT AND TRADEMARK OFFICE
CERTIFICATE OF CORRECTION

PATENT NO. : 7,533,856 B2
APPLICATION NO. : 10/507075
DATED : May 19, 2009
INVENTOR(S) : Berthold Mollenhauer It is certified that error appears in the above-identified patent and that said Letters Patent is hereby corrected as shown below:

At column 11, claim 2, line 1, "bead" should read --head--.

At column 11, claim 3, line 5, "pat" should read --path--.

At column 11, claim 12, line 56, "tillable" should read --tiltable--.

At column 11, claim 12, line 66, "carder" should read --carrier--.

Signed and Sealed this

Fourth Day of August, 2009

JOHN DOLL
*Acting Director of the United States Patent and Trademark Office*